(12) United States Patent
Huang (10) Patent No.: US 6,226,106 B1
(45) Date of Patent: *May 1, 2001

(54) SCANNING SYSTEM WITH RETRACTABLE IMAGE CAPTURING DEVICE

(75) Inventor: Ming-Sung Huang, Hsinchu (TW)

(73) Assignee: Mustek Systems Inc., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,869

(22) Filed: Jun. 5, 1998

(51) Int. Cl.[7] .................................................. H04N 1/04
(52) U.S. Cl. ............................................................ 358/474
(58) Field of Search .................................. 358/474, 487, 358/471, 498, 473, 494, 476, 480, 490, 491, 492, 497; 355/308, 233, 234, 235

(56) References Cited

U.S. PATENT DOCUMENTS

| | | | |
|---|---|---|---|
| 4,989,237 | * | 1/1991 | Kotani et al. .......................... 379/100 |
| 5,351,139 | * | 9/1994 | Miyahara et al. ..................... 358/487 |
| 5,367,386 | * | 11/1994 | Copenhaver .......................... 358/474 |
| 5,663,812 | * | 9/1997 | Pan ......................................... 358/474 |
| 5,663,813 | * | 9/1997 | Pan ......................................... 358/474 |
| 5,742,407 | * | 4/1998 | Albrecht et al. ....................... 358/496 |
| 5,790,278 | * | 8/1998 | Ehren et al. ........................... 358/496 |
| 5,814,809 | * | 9/1998 | Han ................................... 250/208.01 |
| 5,818,611 | * | 10/1998 | Shih ....................................... 358/474 |
| 5,936,747 | * | 8/1999 | Lin et al. ............................... 358/496 |

* cited by examiner

Primary Examiner—Jerome Grant, II
(74) Attorney, Agent, or Firm—Lowe Hauptman Gilman & Berner, LLP (57) ABSTRACT

The scanning system with a retractable scanning portion in the present invention includes a frame and an image capturing device. The frame provides a space for receiving parts of the scanning system. The image capturing device is retractably mounted within the frame. The scanning system can further includes means for guiding a document into the image capturing device. Means for retracting the image capturing device from the frame can also be added. The document guiding means can be a foldable paper guide which is attached with the image capturing device and can be received into the frame with the image capturing device. In addition, the foldable paper guide has a pair of sildable guiding keys which are mounted on the foldable paper guide and slidably in parallel with a document front. The scanning system can be mounted to a computer, a keyboard, a monitor, or a printer by the frame.

13 Claims, 7 Drawing Sheets

SCANNING SYSTEM WITH RETRACTABLE IMAGE CAPTURING DEVICE

FIELD OF THE INVENTION

The present invention relates to a scanning system, and more specifically, to a scanning system with retractable image capturing device.

BACKGROUND OF THE INVENTION

The scanning system is a image processing tool popularly employed for scanning the image of documents, photographs, and even objects. The image is transferred to accessible signal or data for the computer. The document is illuminated by a light source during scanning. The image is then transferred upon a CCD (Charge-Coupled Device) set through a set of lenses or a CIS (Contact Image Sensor) set. The CCD set or the CIS set transforms the image to accessible signals. In general, the scanning systems can generally classified into three categories, including a hand-hold scanning system, a sheet feeding scanning system, and a flatbed scanning system.

For receiving large enough documents like eight and a half inch wide A4 document, conventional scanning system is big in volume and occupies a large space. The space occupied is even larger especially for the flatbed scanning system. Most of the scanning system is an isolated peripheral device to a computer system. The isolated device makes it an inefficient peripheral in space and inconvenient to use. In recent years, a scanning system which can be incorporated or integrated with a desktop computer, a laptop computer, or other peripherals like monitors, printers, or keyboards are developed to save more space.

The sheet feeding scanning system is one of the most space-efficient system. The conventional sheet feeding scaring system has a paper guide or a tray for feeding or placing a document. The scanning system with a paper guide generally cost additional volume space for the large volume of the paper guide. The open design of the scanning system suffers the pollution problem of dust and particles and the image quality is influenced. Some of the system use only rollers without paper guide to save more space. However, the system without a paper guide is not convenient to use and cause the problem of tilted document feeding. In the scanning system with a tray for place documents, the complicate mechanical construction makes it hard to design and manufacture. The maximum acceptable length of the documents is also limited with the limited tray size.

SUMMARY OF THE INVENTION

The present invention discloses a scanning system with a retractable image capturing device. The image capturing device can be retract from the scanning system for feeding and scanning a document. The image capturing device can be received within the scanning system when not in use. The space inefficiency of the conventional scanning system can be eliminated. The scanning system can be kept from the pollution of dust and particles. The image capturing device can be kept clean and the image quality can be maintained. The problem of the length limitation in the traditional tray system is also removed.

The scanning system with a retractable scanning portion in the present invention includes a frame and an image capturing device. The frame provides a space for receiving parts of the scanning system. The image capturing device is retractably mounted within the frame. The scanning system can further includes means for guiding a document into the image capturing device. Means for retracting the image capturing device from the frame can also be added.

The document guiding means can be a foldable paper guide which is attached with the image capturing device and can be received into the frame with the image capturing device. In addition, the foldable paper guide has a pair of sildable guiding keys which are mounted on the foldable paper guide and slidably in parallel with a document front. The scanning system can be mounted to a computer, a keyboard, a monitor, or a printer by the frame.

BRIEF DESCRIPTION OF THE DRAWINGS

The foregoing aspects and many of the attendant advantages of this invention will become more readily appreciated as the same becomes better understood by referencing the following detailed description, when taken in conjunction with the accompanying drawings as follows.

DETAILED DESCRIPTION OF THE PREFERRED EMBODIMENTS

The present invention discloses a scanning system with a retractable image capturing device. The image capturing device can be retract from the scanning system for feeding and scanning a document. The image capturing device can be received within the scanning system when not in use. A retracting mechanism can be used to draw out the image capturing device electrically or mechanically. A foldable paper guide attached with the image capturing device can also be employed.

Figure 1:
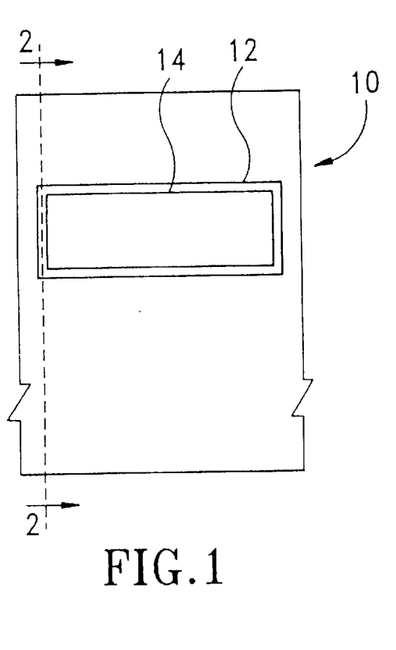
FIG. 1 illustrates a front view of a scanning system with a retractable image capturing device in the present invention.
Figure 2A:
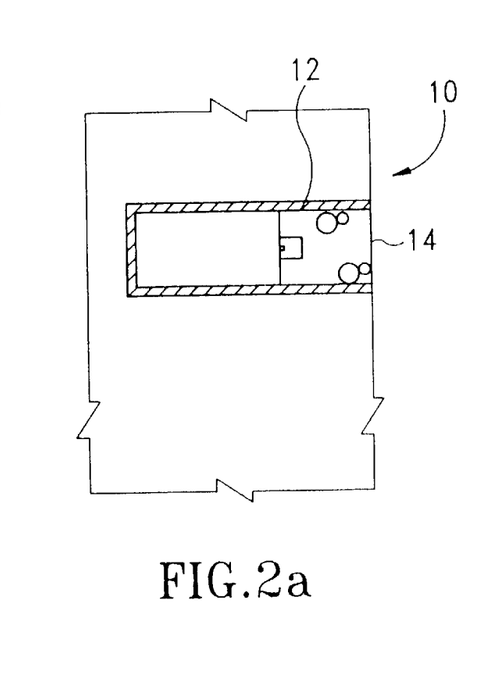
FIG. 2a illustrates a cross sectional view of the scanning system with the retractable image capturing device at a received position in the present invention.
Figure 2B:
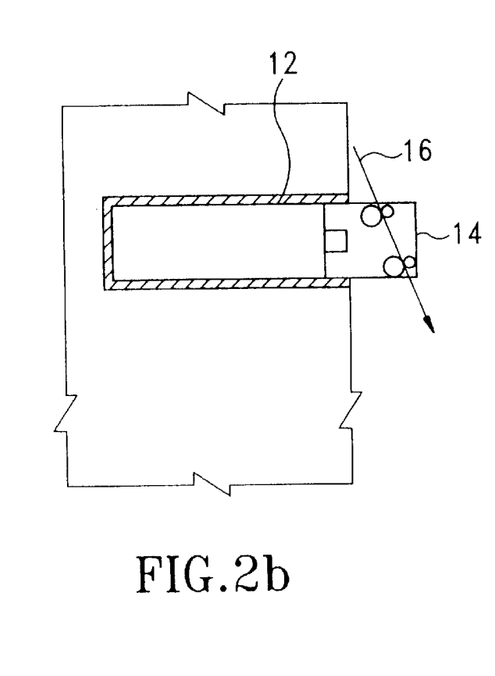
FIG. 2b illustrates a cross sectional view of the scanning system with the retractable image capturing device at a operation position in the present invention.

Referring to FIG. 1, a scanning system 10 with a retractable scanning portion is illustrated in front view. The scanning system 10 has a frame 12 and an image capturing device 14. The cross section view along line 2—2 of the scanning system 10 is illustrated in FIG. 2a. The frame 12 provides a space for receiving all the parts of the scanning system 10. Besides the image capturing device 14, other parts like power supply unit, driving unit, and processing unit of the scanning system 10 are contained within the frame 12. The image capturing device 14 is retractably mounted within the frame 12. When the system is not in use, the image capturing device 14 is received within the frame 10 as indicated. The image capturing device 14 can be retract from the frame 12 to a operation position for performing a document scanning, as shown in FIG. 2b. In other words, the image capturing device 14 shuttles rectilinearly between the received position and the operation position without separating completely from the frame 12. The document can be fed in the direction 16 into the image capturing device 14.

Figure 3:
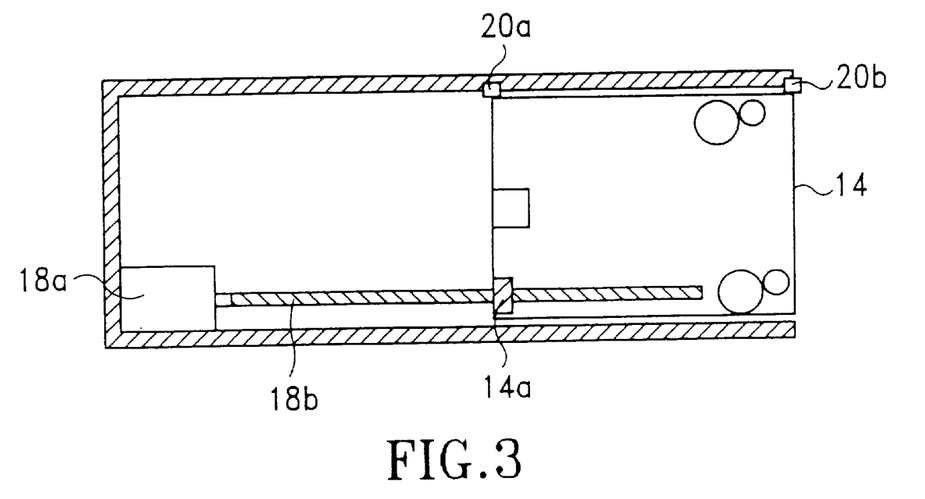
FIG. 3 illustrates a cross sectional view of a scanning system with a motor driven retracting system in the present invention.

The scanning system 1 0 can further contains means for retracting the image capturing device 14 from the frame 12. The retracting mechanism can be a motor driven system 18 to push out and draw in the image capturing device 14 in relative to the frame 12. Referring to FIG. 3, the motor driven system includes a motor 18a and a screw rod 18b. The motor 18a drives the screw rod 18b and the image capturing device 14 is driven by the relative motion of a screw hole 14a on it and the screw rod 18b. Two or more position sensors 20a and 20b can be added to detect the location of the image capturing device 14 and control the retracting motion accurately. The position sensors 20a and 20b can be mechanical sensors or photo sensors which are well known in the art.

Figure 4:
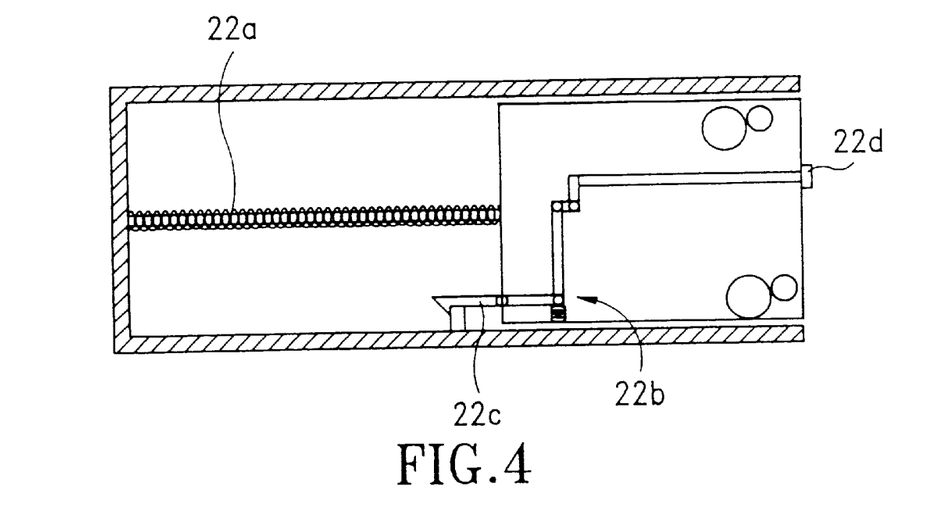
FIG. 4 illustrates a cross sectional view of a scanning system with a first embodiment of mechanical retracting system in the present invention.

In the other way, the retracting mechanism can be a mechanical system to push out and draw in the image capturing device 14 in relative to the frame 12. Referring to FIG. 4, the mechanical system has resilient means 22a and positioning means 22b. The resilient means or device 22a can be a helical spring and a rod to push out the image capturing device 14 from the frame 12. The positioning means 22b is used to lock the image capturing device 14 in a received position.

As a first embodiment, the positioning means 22b includes one or more hooks 22c and one or more release buttons 22d. The hooks 22c are pivotally mounted on the image capturing device 14 can rotate to lock the image capturing device 14 to the frame 12 when it is in the received position. The release buttons 22d on image capturing device 14 are linked with the hooks 22c which can be pushed to rotate the hooks 22c. Thus the image capturing device 14 can be released and popped out to a operation position.

Figure 5A:
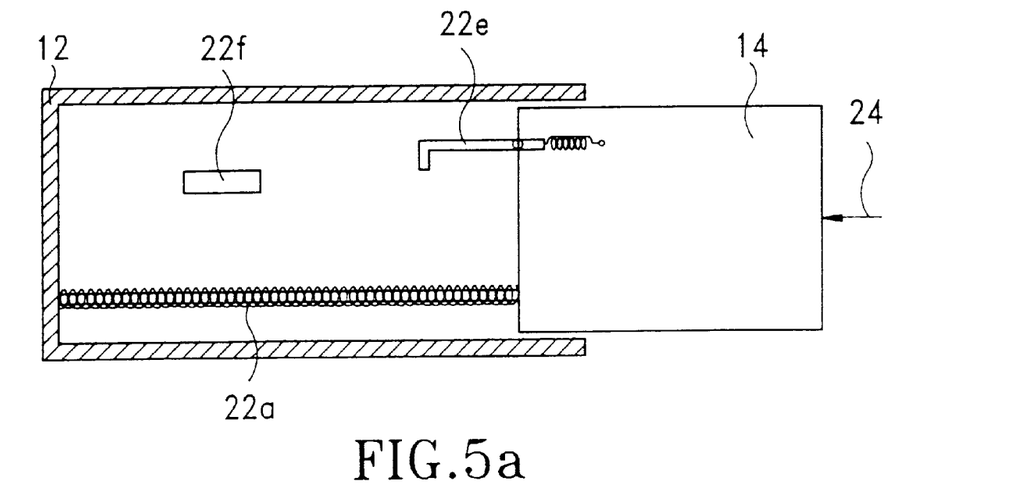
FIG. 5a illustrates a cross sectional view of a scanning system with a second embodiment of mechanical retracting system in the present invention.
Figure 5B:
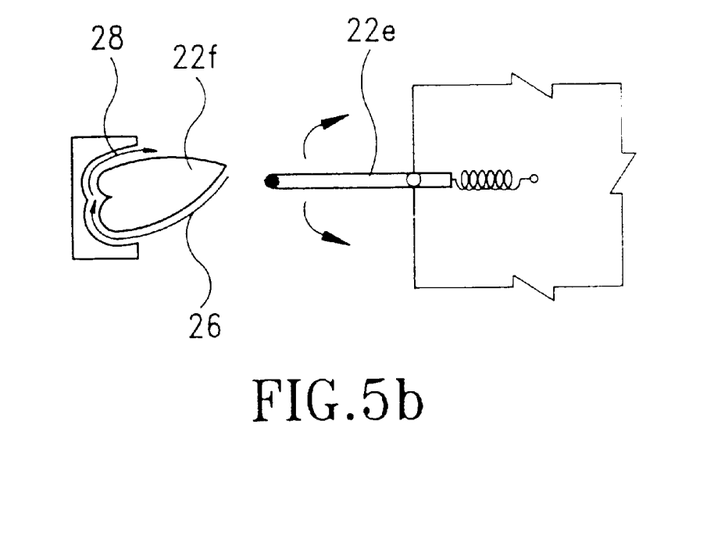
FIG. 5b illustrates in detail a top view of a portion of the second embodiment of mechanical retracting system in the present invention.

In a second embodiment, the positioning means 22b includes a rotatable hook 22e and a lock 22f as shown in FIG. 5a. The hook 22e on the image capturing device 14 follows a hook path in the lock 22f when the image capturing device 14 is pushed in. The image capturing device 14 can be locked in the received place when pushed in. One more push of the image capturing device 14 in the direction 24 can release it out. Referring to FIG. 5b, the action between the hook 22e and the lock 22f is illustrated in detail with a top view. When the image capturing device 14 is pushed in, the hook 22e follows the path 26 and locked at the end point. When the image capturing device 14 is pushed in again, the hook 22e follows the path 28 to release the image capturing device 14.

Figures 6A, 6B:
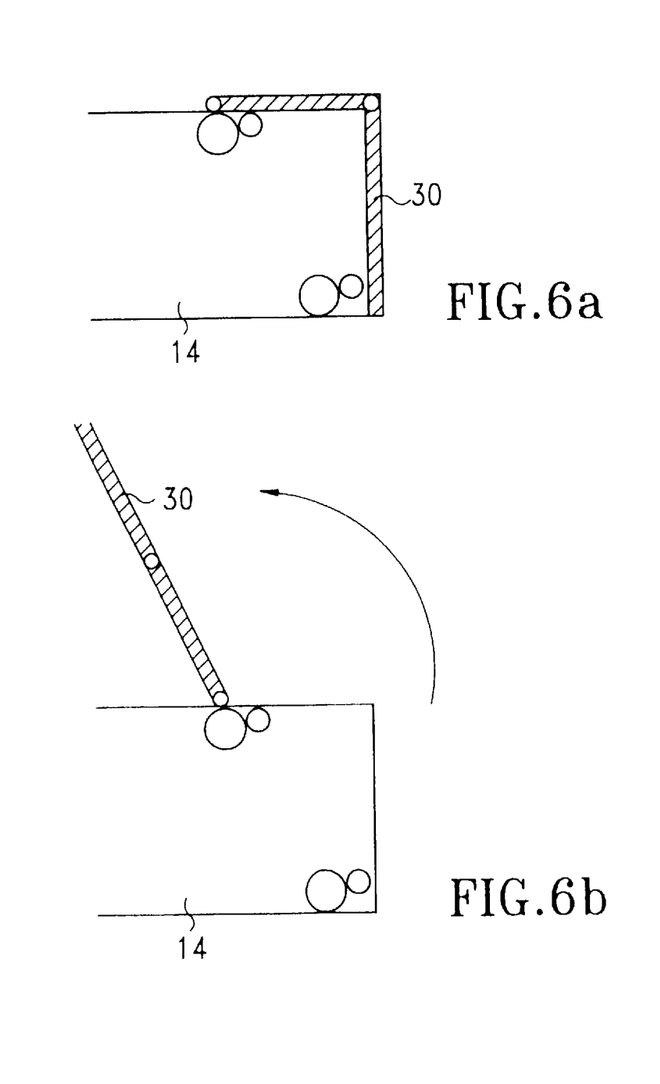
FIG. 6a illustrates a cross sectional view of a scanning system with a foldable paper guide in the present invention.
FIG. 6b illustrates a cross sectional view of a scanning system with the foldable paper guide stretched in the present invention.
Figure 6C:
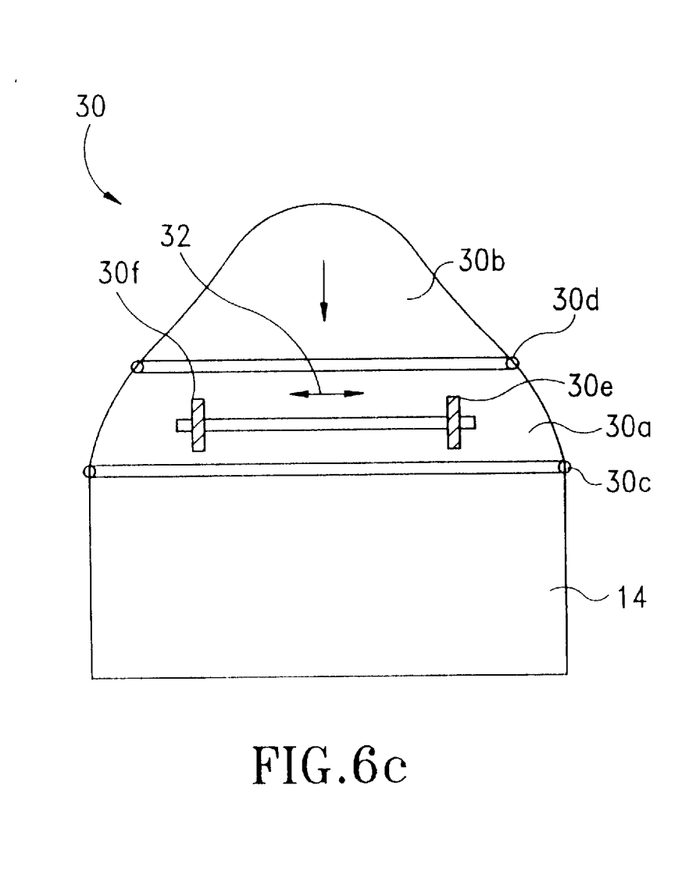
FIG. 6c illustrates a front view of the foldable paper guide in the present invention.

Referring to FIG. 6a, the scanning system 10 can have means for guiding a document into the image capturing device 14. In the case, a foldable paper guide 30 is attached to the image capturing device 14. The foldable paper guide 30 is folded in two members by two pivots onto the surface of the image capturing device 14. Thus the foldable paper guide 30 can be received into the frame 12 with the image capturing device 14. Referring to FIG. 6b, the paper guide 30 can be stretched right above a paper insertion opening of the image capturing device 14. Thus the document can be fed vertically and smoothly into the image capturing device 14. The paper guide 30 is illustrated in a front view in FIG. 6c. The paper guide 30 has two members 30a and 30b and two hinge rods 30c and 30d. The paper guide 30 can also have a pair of width variable guiding keys 30e and 30f, which are mounted on the paper guide 30. The guiding keys 30e and 30f are slidable in parallel with a document front, namely the direction 32 as indicated.

Figure 7:
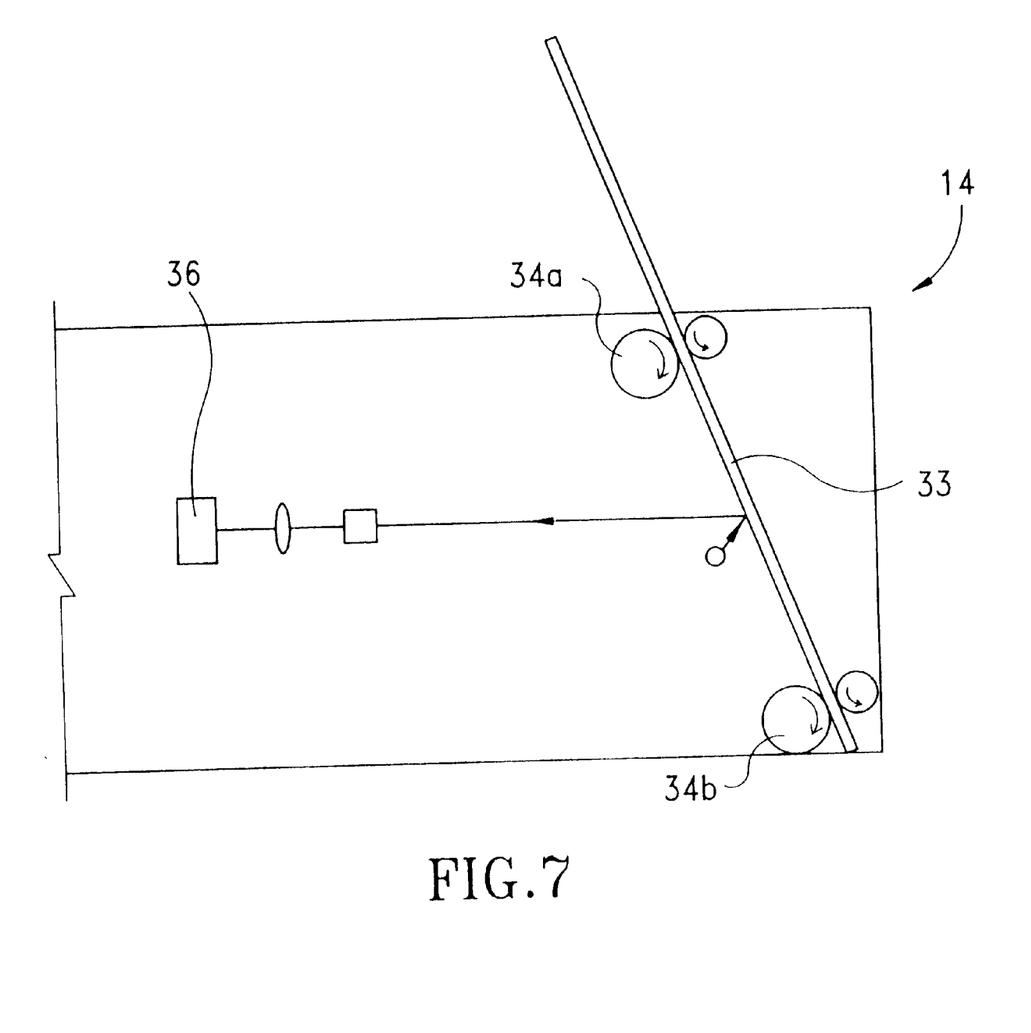
FIG. 7 illustrates a cross sectional view of the construction of the image capturing device in the present invention.

Referring to FIG. 7, the construction of the image capturing device 14 is illustrated in detail. In general, one or more roller sets are used for feeding a document 33. Two roller sets 34a and 34b are used in the embodiment. The image capturing device 14 contains a document scanning device. Document scanning devices like widely applied CIS (Contact Image Sensor) or CCD (charge-coupled device) can be employed. A CCD set 36 with other well known cooperated parts are shown in the figure.

Figure 8A:
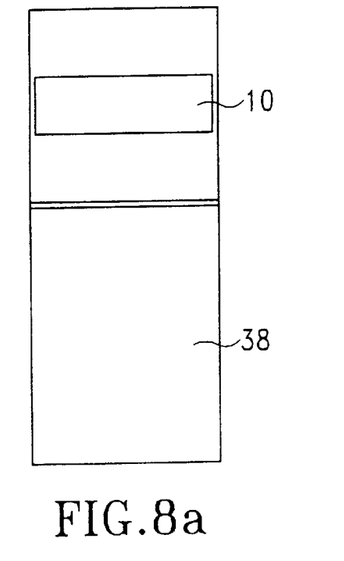
FIG. 8a illustrates the scanning system mounted on a computer in the present invention.
Figure 8B:
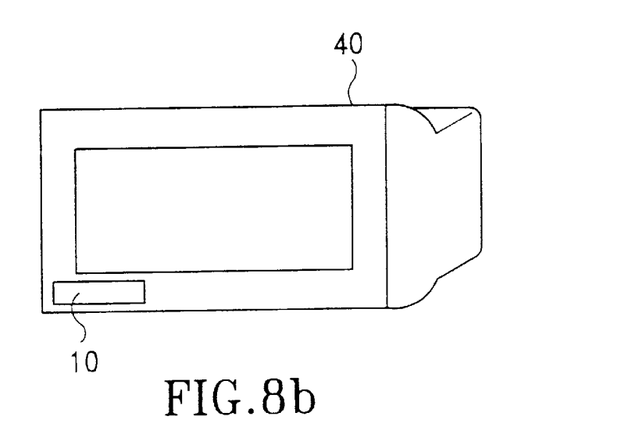
FIG. 8b illustrates the scanning system mounted on a monitor in the present invention.
Figure 8C:
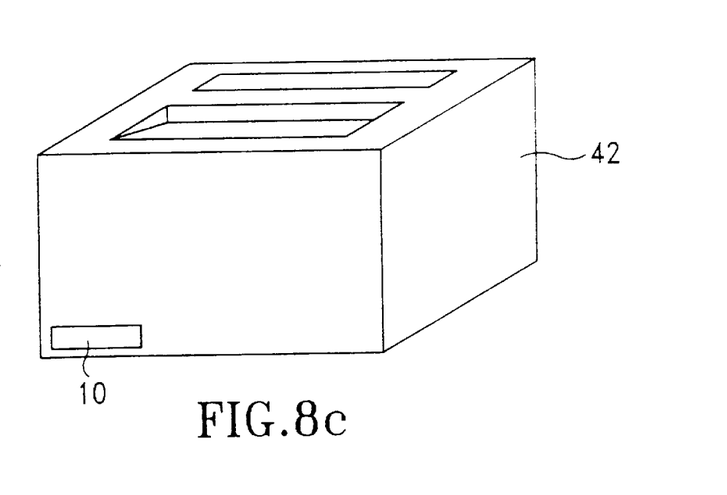
FIG. 8c illustrates the scanning system mounted on a printer in the present invention.
Figure 8D:
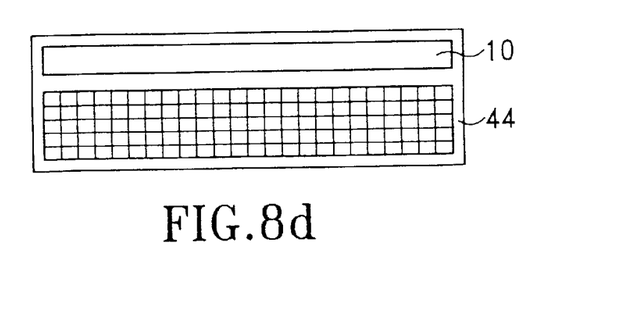
FIG. 8d illustrates the scanning system mounted on a keyboard in the present invention.

The scanning system 10 with the retractable image capturing device 14 can be mounted on computers or other peripherals. The scanning system 10 is mounted on a computer 38 as shown in FIG. 8a. The scanning system 10 is mounted on a monitor 40 as shown in FIG. 8b. The scanning system 10 can also be mounted on a printer 42 as shown in FIG. 8c. Referring to FIG. 8d, an example of the scanning system 10 mounted on a keyboard 44 is illustrated.

Figure 9A:
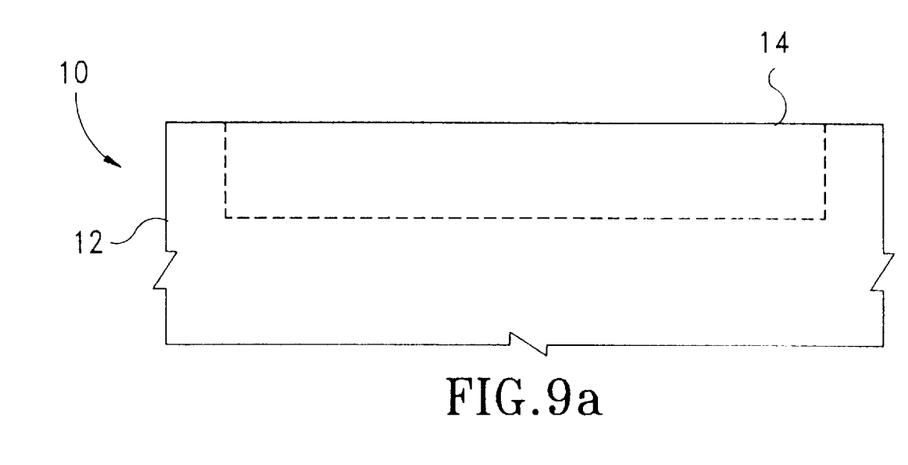
FIG. 9a illustrates a top view of the scanning system with a popping-up design at a received position in the present invention.
Figure 9B:
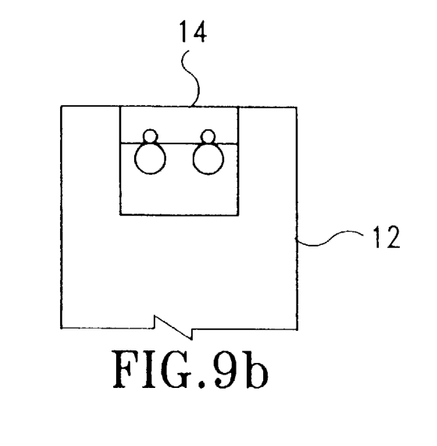
FIG. 9b illustrates a cross sectional view of the scanning system with a popping-up design at a received position in the present invention.
Figure 9C:
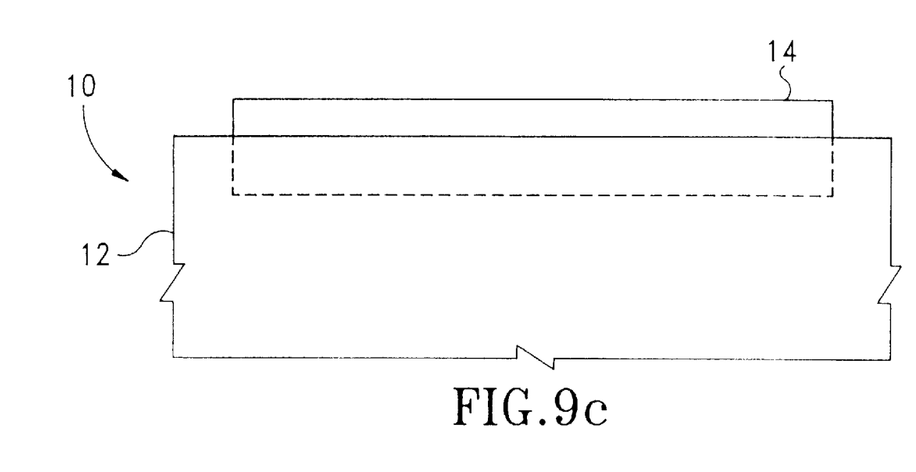
FIG. 9c illustrates a top view of the scanning system with a popping-up design at a operation position in the present invention.
Figure 9D:
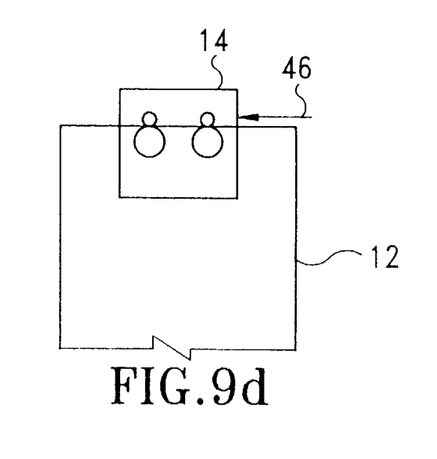
FIG. 9d illustrates a cross sectional view of the scanning system with a popping-up design at a operation position in the present invention.

The scanning system 10 are illustrated with a horizontal retractable system as above. Besides retracting in sideway, the scanning system 10 in the present invention can also be implemented with a popping-up design. The design can be utilized with the peripherals like keyboards or printers for better compatibility and functionality. Referring to FIG. 9a, the image capturing device 14 is contained in the frame 12 at a received position in a top view. The side view is illustrated in FIG. 9b. Referring to FIG. 9c, the image capturing device 14 is popped-out to perform a scanning operation. The side view is illustrated in FIG. 9d and the document can be fed in the direction 46.

The present invention disclose a scanning system with a retractable image capturing device. The image capturing device can be retract from the scanning system for feeding and scanning a document. The image capturing device can be received within the scanning system when not in use. A retracting mechanism can be used to draw out the image capturing device electrically or mechanically. A foldable paper guide attached with the image capturing device is also disclosed. The space occupied by the paper guide can be eliminated. The space inefficiency of the conventional scanning system can also be eliminated. The scanning system can be kept from the pollution of dust and particles and thus a clean image quality can be maintained. The problem of the length limitation in the conventional tray system is also removed. The scanning system in the present invention can be incorporated or integrated into computers and other peripherals to save space.

As is understood by a person skilled in the art, the foregoing description of the preferred embodiment of the present invention is illustrative of the present invention rather than a limitation thereon. It is intended to cover various modifications and similar arrangements included within the spirit and scope of the appended claims. The scope of the claims should be accorded with the broadest interpretation so as to encompass all such modifications on the similar structure. While the preferred embodiment of the invention has been illustrated and described, it will be appreciated that various changes can be made therein without departing from the spirit and scope of the invention.

What is claimed is:

1. A scanning system with a retractable scanning portion, said scanning system comprising:
    parts of said scanning system;
        an image capturing device, retractably mounted as a whole into said receiving space when not in use, to be draw out rectilinearly to an operation position on said frame for performing a scan by feeding a sheet document through rollers inside said image capturing device;
        retracting means for drawing out rectilinearly said image capturing device between a received position and said operation position on said frame; and
        guiding means for guiding a document into said image capturing device;
        wherein said document guiding means comprises a foldable paper guide which is attached with said image capturing device and can be received into said frame with said image capturing device.

2. The scanning system of claim 1, wherein said foldable paper guide has a pair of slidable guiding keys which are mounted on said foldable paper guide slidably in parallel with a document front.

3. A scanning system according to claim 1, wherein said frame and said image capturing device are assembled into a device selected from the group consisting of a computer, a keyboard, a monitor, and a printer.

4. A scanning system with a retractable scanning portion, said scanning system comprising:
    a frame providing a receiving space for receiving parts of said scanning system;
    an image capturing device, retractably mounted as a whole into said receiving space when not in use, to be draw out rectilinearly to an operation position on said frame for performing a scan by feeding a sheet document through rollers inside said image capturing device;
    retracting means for drawing out rectilinearly said image capturing device between a received position and said operation position on said frame; and
    guiding means for guiding a document into said image capturing device;
    wherein said frame and said image capturing device are assembled into a device selected from the group consisting of a computer, a keyboard, a monitor, and a printer.

5. A scanning system according to claim 4, wherein said document guiding means comprises a foldable paper guide which is attached with said image capturing device and can be received into said frame with said image capturing device.

6. The scanning system according to claim 5, wherein said foldable paper guide has a pair of slidable guiding keys which are mounted on said foldable paper guide slidably in parallel with a document front.

7. A scanning system with a retractable scanning portion, said scanning system comprising:
    a frame providing a receiving space for receiving parts of said scanning system;
    an image capturing device, retractably mounted as a whole into said receiving space when not in use, to be drawn out rectilinearly to an operation position on said frame for performing a scan by feeding a sheet document through rollers inside said image capturing device;
    retracting means for drawing out rectilinearly said image capturing device between a received position and said operation position on said frame; and
    a foldable paper guide for guiding a document into said image capturing device, said foldable paper guide being attached to said image capturing device so as to be received into said frame with said image capturing device.

8. The scanning system of claim 7, wherein said retracting means comprises a motor driven system to push out and draw in said image capturing device in relative to said frame.

9. The scanning system of claim 7, wherein said retracting means comprises:
    resilient means to push out said image capturing device from said frame; and
    positioning means to lock said image capturing device in a received position, said positioning means comprising:
        at least one hooks being pivotally mounted on said image capturing device to lock up at said received position; and
        at least one release buttons on said image capturing device, said at least one release buttons being linked with said at least one hooks to be pushed to retract said image capturing device.

10. The scanning system of claim 7, wherein said foldable paper guide has a pair of guiding keys which are slidably mounted on said foldable paper guide in parallel with a document front.

11. The scanning system of claim 7, wherein said document scanning device comprises a CIS (Contact Image Sensor) set or a CCD (charge-coupled device) set.

12. The scanning system of claim 7, wherein said frame and said image capturing device are assembled into a device selected from the group consisting, of a computer, a keyboard, a monitor, and a printer.

13. A scanning system with a retractable scanning portion, said scanning system comprising:

a frame providing a receiving, space for receiving parts of said scanning system;

an image capturing device, retractably mounted as a whole into said receiving space when not in use, to be drawn out rectilinearly to an operation position on said frame for performing a scan by feeding a sheet document through rollers inside said image capturing device;

retracting means for drawing out rectilinearly said image capturing device from said frame, wherein said retracting means comprising, a motor driven system to push out and draw in rectilinearly said image capturing device between a received position and said operation position; and a foldable paper guide for guiding a document into said image capturing device, said foldable paper guide being attached to said image capturing device to be received into said frame with said image capturing device.

* * * * *